United States Patent [19]
Sinh

[11] Patent Number: 4,963,767
[45] Date of Patent: Oct. 16, 1990

[54] TWO-LEVEL ECL MULTIPLEXER WITHOUT EMITTER DOTTING

[75] Inventor: Nguyen X. Sinh, San Jose, Calif.

[73] Assignee: National Semiconductor Corporation, Santa Clara, Calif.

[21] Appl. No.: 236,567

[22] Filed: Aug. 25, 1988

[51] Int. Cl.[5] .................. H03K 19/086; H03K 17/16
[52] U.S. Cl. ................................. 307/455; 307/467; 307/443; 307/243
[58] Field of Search ............... 307/454, 455, 456, 466, 307/467, 241, 242, 243, 270, 443

[56] References Cited

U.S. PATENT DOCUMENTS

| | | | |
|---|---|---|---|
| 3,550,040 | 12/1970 | Sinusas | 307/242 |
| 3,681,614 | 8/1972 | Kroos | 307/243 |
| 3,783,307 | 1/1974 | Breuer | 307/243 |
| 4,196,358 | 4/1980 | Conover et al. | 307/243 |
| 4,256,980 | 3/1981 | Asada et al. | 307/243 |
| 4,349,750 | 9/1982 | Geurts | 307/243 |
| 4,354,266 | 10/1982 | Cooperman et al. | 307/243 |
| 4,695,749 | 9/1987 | Lam | 307/243 |

Primary Examiner—Stanley D. Miller
Assistant Examiner—Trong Phan
Attorney, Agent, or Firm—Lee Patch; Robert C. Colwell; Elliot B. Aronson

[57] ABSTRACT

A two-level 4:1 ECL multiplexer circuit comprising two 2:1 multiplexer circuits "OR'd" together prior to a shared output stage. A differential Select line, operable at the same voltage level as the input data lines to the 2:1 multiplexer circuits selects one of the input lines to each 2:1 multiplexer circuit. A second Select line, operable at a different voltage level, selects one or the other of the 2:1 multiplexer circuits. This arrangement functions to eliminate an undesirable glitch observed when selecting data inputs in known two-level, 4:1 multiplexers which use emitter dotting.

6 Claims, 1 Drawing Sheet

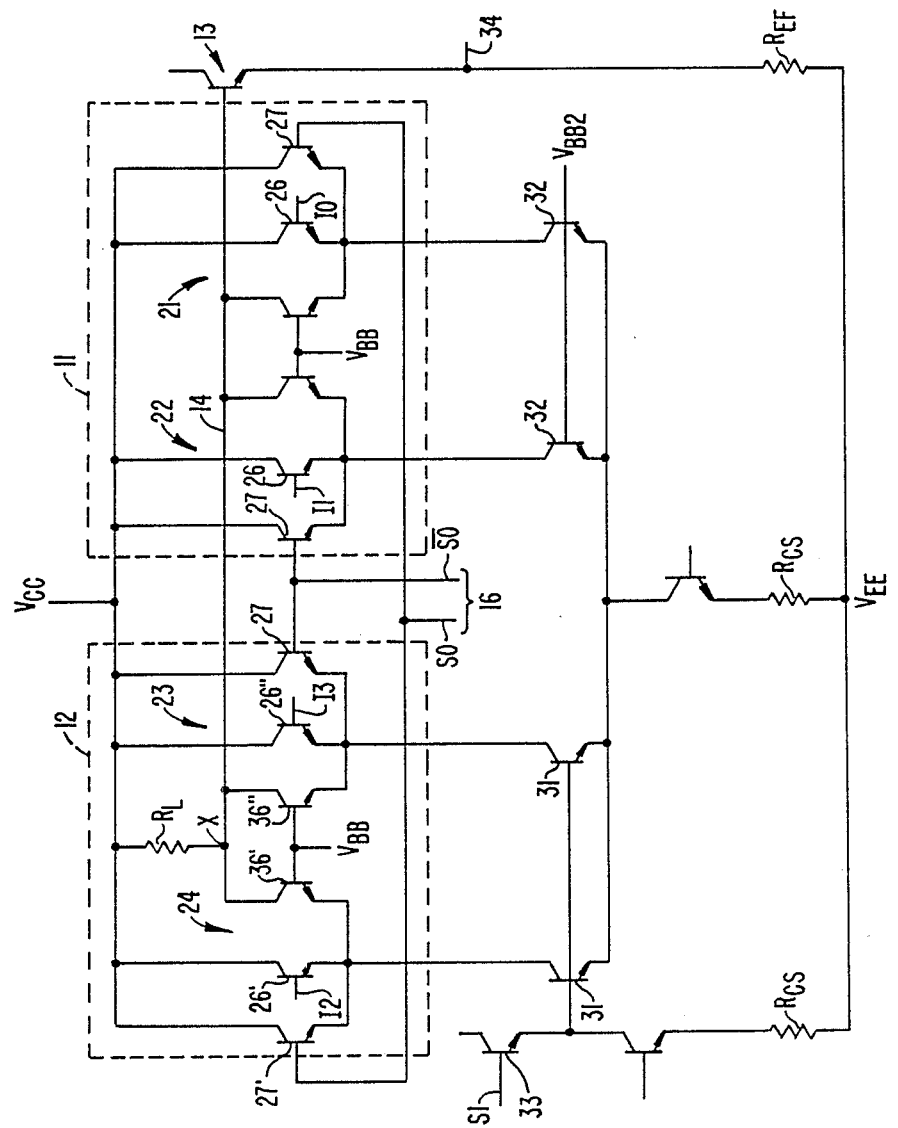
FIG._1.

TWO-LEVEL ECL MULTIPLEXER WITHOUT EMITTER DOTTING

BACKGROUND OF THE INVENTION

The present invention relates generally to emitter-coupled logic (ECL) circuitry for use with multiplexers and gate arrays.

A multiplexer is a device which allows any one of a number of input signals to be selected and shifted to an output line. The selection of an input is made according to the electronic logic state of one or more Select lines.

Multiplexers are common circuit elements which are often used in integrated circuit technology as building blocks of larger circuits. Some silicon-based integrated circuits, for example, gate arrays, may include as many as a thousand or more component multiplexer circuits.

Where speed of operation is important, integrated circuits are often designed using ECL circuitry, which currently provides the fastest form of siliconbased circuitry.

Several approaches have been followed in the past in the design of four-to-one (4:1) multiplexers (i.e., multiplexers selecting one output from four inputs) using ECL circuitry. In one approach each of the four input signals is associated with its own dedicated Enable line for enabling the signal to be passed to the output. The four input signals are selected by appropriate circuitry, e.g., a pair of Select lines coupled to the Enable lines by a 2:4 decoder circuit. This approach is disadvantageous in that it calls for a relatively large number of transistors, which in turn occupy a relatively large amount of valuable area on the silicon chip, which otherwise could be used for other circuit elements. The large number of transistors also results in high power consumption, which can require further measures to dissipate excess heat. This approach also introduces a comparatively long delay between the Select operation and the arrival of the selected signal at the output, undesirably extending the propagation time through the circuit element.

In another approach, a 4:1 ECL multiplexer is compounded from two 2:1 multiplexer circuits. In this approach the outputs of the component 2:1 multiplexer circuits are logically "OR'd" together so that one or the other output will always be available as the output of the composite 4:1 multiplexer. Each of the component 2:1 multiplexers typically terminates in its own emitter-follower follower circuit, and the logic "OR" arrangement is provided by tying the emitters of the individual emitterfollowers together—a practice commonly referred to as emitter dotting. A dedicated Select line is provided for choosing between the output emitter-followers of the two component circuits.

This approach is advantageous over the first approach in that it requires fewer transistors to implement and calls for less power consumption. However, it introduces a problem associated with the use of emitter dotting.

In selecting one or the other component 2:1 multiplexer output, a first output emitter-follower is deactivated as the other is activated. This operation has been observed to produce an undesirable glitch at the output when the Select line changes state. In some circumstances the glitch can accidentally trigger the next logic gate.

To avoid the undesirable consequences of the glitch, it has been necessary in the past to slow down the operation of the gate to allow the glitch to pass undetected. This, of course, prevents the circuit designer from taking full advantage of the superior speed of ECL circuitry.

As a way of eliminating the emitter-dotting glitch, some circuit designers have avoided the use of emitter dotting altogether by resorting to a three-level scheme of voltages for the input and Select lines to the multiplexer. The input lines are operated at a first, or top, voltage level, and the Select lines are operated at two lower levels. By contrast, the emitterdotting design can generally be operated at two voltage levels—the input lines at the top level and all the Select lines at the second level. Three-level multiplexers, however, require greater power. In a gate array with more than a thousand gates, this produces a considerable increase in power dissipation, which is undesirable and which requires additional techniques to dissipate the heat generated.

SUMMARY OF THE INVENTION

The present invention provides a 4:1 ECL multiplexer circuit which does not use emitter dotting, and consequently avoids the glitch observed in the past, yet which can be operated according to the more efficient two voltage-level scheme.

Briefly, a 4:1 multiplexer according to the present invention includes a pair of 2:1 multiplexer circuits, each receiving a pair of input lines. A differential Select line is provided for selecting an input line from each 2:1 multiplexer circuit. The differential Select line has two sides, one of which carries a "true" logic signal while the other carries the complementary logic signal. A first side of the differential Select line is connected in logic "OR" arrangement with a first input line of each of the 2:1 multiplexers and the second side is connected in logic "OR" arrangement with the second input line of each of the 2:1 multiplexers. The differential Select line is operated at the same voltage level as the input lines. The multiplexer circuit further includes a second Select line, which operates at a second voltage level, and which is operatively associated with the two 2:1 multiplexer circuits so as to select one or the other. The two 2:1 multiplexer circuits share a common output stage and are connected in logic "OR" arrangement prior to their common output state.

With this arrangement, if one side of the differential Select line is "true" then by virtue of the "OR" arrangement the multiplexer circuit will not be affected by the logic value of the signal on the "OR'd" input line, and the input line is thereby effectively de-selected. At the same time the opposite side of the differential Select line will be "false" so that the multiplexer will respond to the logic value of the signal on the input line "OR'd" with the "false" Select line.

A multiplexer circuit according to the present invention has a number of advantages, including the fact that it eliminates the need for emitter dotting the outputs of the two 2:1 multiplexer circuits together, and consequently eliminates the undesirable glitch normally associated with emitter dotting. The circuit according to the invention operates at only two input voltage levels and may be implemented with a relatively low transistor count, thereby avoiding the higher power consumption characteristic of certain other methods used in the past to eliminate the emitter-dotting glitch.

Since the glitch is eliminated, it is of course not necessary to slow down the system operation to wait for the glitch to pass. Thus a multiplexer circuit according to the present invention is better able to take advantage of the higher propagation speeds available in ECL circuitry.

Other aspects advantages and novel features of the invention are described hereinbelow or will be readily apparent to those skilled in the art from the following specifications and drawings of an illustrative embodiment.

BRIEF DESCRIPTION OF THE DRAWING

FIG. 1 is a circuit schematic of a four-to-one multiplexer according to the invention.

DETAILED DESCRIPTION OF A PREFERRED EMBODIMENT

A specific embodiment of a circuit according to the invention is illustrated in FIG. 1. A multiplexer circuit according to the invention includes first and second 2:1 multiplexer circuits 11 and 12, each receiving a pair of input data lines, I0, I1, and I2, I3, respectively. The 2:1 multiplexer circuits 11 and 12 share a common output stage, indicated generally at 13, and are connected in logic "OR" arrangement at output line 14 prior to application to the common output stage 13.

The multiplexer circuit further includes a differential Select line, indicated generally at 16, which is coupled to both of the component 2:1 multiplexer circuits 11 and 12 so as to select one input line from each pair going to the component multiplexer circuits. As used herein, "differential line" refers to a two-sided line, the two sides of which carry complementary signals: that is, if a first side carries a logic "true" signal the other side carries a logic "false" signal. In FIG. 1, one side of the differential Select line 16 is labeled SO, and the other $\overline{SO}$. The first side SO is connected in logic "OR" arrangement with input line I0 of 2:1 multiplexer 11 and with input line I2 of 2:1 multiplexer 12. The other side $\overline{SO}$ is similarly connected in logic "OR" arrangement with input lines I1 and I3.

The 4:1 multiplexer of FIG. 1 further includes a second Select line S1, which is illustrated as a singlesided Select line in FIG. 1. The Select line S1 is connected so as to enable a first of the 2:1 multiplexer circuits, while disabling the other 2:1 multiplexer circuit, thereby selecting one or the other as the active circuit.

Each of the 2:1 multiplexer circuits 11 and 12 includes a pair of emitter-coupled differential amplifiers 21. 22 and 23, 24, respectively. Each input line is coupled to its associated differential amplifier through input transistors 26, 26, or 26". To achieve the logic "OR" arrangement with the differential Select line 16, each differential amplifier includes a second transistor 27 or 27' connected in parallel with the associated input transistor, which is gated at the transistor base by the associated side SO or $\overline{SO}$ of the differential Select line 16.

In the embodiment of FIG. 1, the differential amplifiers 21–24 share a common load resistor $R_L$.

The return current path for the differential amplifiers 21–24 is provided through the transistors 31 and 32. The single-sided Select line S1 is connected through transistor 33 to control the transistors 31 and thereby to gate the current flow either through the transistors 31 or through the transistors 32. In this manner, the Select line S1 serves to enable one or the other of the 2:1 multiplexers 11 and 12. Through this arrangement, the Select line S1 operates at a second input voltage level, thereby avoiding the need for further operating input voltage levels. With this arrangement, the circuit may be operated with a supply voltage $V_{EE}$ of $-4.5 \pm 0.3$ volts.

In the embodiment of FIG. 1, the output stage 13 is provided by a single emitter-follower circuit having output node 34.

The operation of the circuit of FIG. 1 proceeds as follows. Assume that Select line S1 has selected 2:1 multiplexer 12. With reference to multiplexer circuit 12, when SO is high, the current passing through differential amplifier 24 is drawn through transistor 27' (and transistor 26'. if I2 is also high) and is effectively shunted away from the transistor 36 and load resistor $R_L$. With the current shunted away in this manner, the amplifier 24 will not produce a potential drop across $R_L$, and hence will leave the output line 14 in a high state regardless of the state of I2, thereby effectively disabling I2.

When SO is high, then $\overline{SO}$ is necessarily low. When $\overline{SO}$ is low, then the current will be carried either by transistor 36" or 26" of differential amplifiers 23. depending on the state of input line I3.

When input line I3 is high, transistor 26" will carry all the current and no current will pass through transistor 36" and resistor $R_L$. With no potential drop across the resistor $R_L$, the output line 14 will be high, so that the input signal at I3 is shifted to the output line 14. Correspondingly, when the data line I3 is low, transistor 26" will not be conducting. The current instead is drawn through transistor 36" and resistor $R_L$. With the consequent potential drop across resistor $R_L$, a low is shifted to the output line 14.

A truth table is shown in Table I for differential amplifier 24. The signals on Select line SO and input line I2 are taken as input values, and the value at node X (on output line 14) is taken as the output value. Table I is identical to the truth table of an "OR" gate. Similar truth tables are associated with the other differential amplifiers.

TABLE I

| SO | I2 | X |
|----|----|----|
| H | H | H |
| H | L | H |
| L | H | H |
| L | L | L |

While the above provides a full and complete disclosure of an illustrative and preferred embodiment of the present invention, various modifications. alternate constructions, and equivalents may be employed without departing from the spirit and scope of the invention. For example, although described herein as an isolated four-to-one multiplexer embodiment, a circuit according to the invention may be used to advantage as a building block of larger multiplexer or other circuits. Therefore, the invention is not to be limited to the specific embodiment disclosed above, but is defined by the appended claims.

What is claimed is:

1. A 4:1 multiplexer circuit comprising:
   first and second 2:1 ECL multiplexer circuits receiving first and second pairs of input lines, respectively, at a first voltage level, wherein said 2:1 multiplexer circuits share a common output stage and have respective outputs connected together prior to said output stage;
   a differential Select line operable at said first voltage level and having first and second complementary sides, wherein said first side is connected in logic "OR" arrangement with a first input line of each said pair and said second side is connected in logic "OR" arrangement with the second input line of each said pair, whereby said differential Select line operates to select one of said input lines for each of said 2:1 multiplexer circuits; and a second Select line operable at a second voltage level and operatively associated with said first and second 2:1 multiplexer circuits to select one of said circuits, whereby a signal on one of said selected input lines is provided to said common output stage.

2. The circuit of claim 1 wherein said second Select line is connected to gate current flow through said first and second 2:1 multiplexer circuits.

3. The circuit of claim 1 wherein said common output stage comprises a common emitter-follower.

4. A 4:1 ECL multiplexer circuit comprising:
first and second pairs of emitter-coupled differential amplifiers, each said amplifier receiving an input line at a first voltage level;

a differential Select line having first and second sides operable at said first voltage level, said sides being coupled to respectively enable and disable the amplifiers of each said pair, whereby an amplifier and associated input line are selected from each said pair;

a second Select line operable at a second voltage level and coupled to respectively enable and disable said first and second amplifier pairs, whereby one of said pairs is selected; and an output stage coupled to said amplifiers, wherein said amplifiers have respective outputs connected together prior to said output stage.

5. The multiplexer of claim 4, wherein each said amplifier includes a first transistor gated by the associated input line at said first voltage level and a second transistor connected in parallel with said first transistor and gated at said first voltage level by a respective side of said differential Select line.

6. The multiplexer of claim 5, wherein said output stage comprises an emitter-follower.

* * * * *